(12) United States Patent
Miki

(10) Patent No.: US 9,236,983 B2
(45) Date of Patent: Jan. 12, 2016

(54) REMOVING INTERFERENCE IN NON-ORTHOGONAL RADIO ACCESS

(75) Inventor: Nobuhiko Miki, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 13 days.

(21) Appl. No.: 14/343,535

(22) PCT Filed: Sep. 7, 2012

(86) PCT No.: PCT/JP2012/072856
§ 371 (c)(1),
(2), (4) Date: Mar. 7, 2014

(87) PCT Pub. No.: WO2013/035825
PCT Pub. Date: Mar. 14, 2013

(65) Prior Publication Data
US 2014/0220988 A1    Aug. 7, 2014

(30) Foreign Application Priority Data

Sep. 9, 2011   (JP) ................................ 2011-196616

(51) Int. Cl.
*H04W 72/00* (2009.01)
*H04L 5/00* (2006.01)
*H04W 72/08* (2009.01)

(52) U.S. Cl.
CPC ........... *H04L 5/0037* (2013.01); *H04W 72/085* (2013.01)

(58) Field of Classification Search
None
See application file for complete search history.

(56) References Cited

U.S. PATENT DOCUMENTS

2004/0066766 A1* 4/2004 Shiu et al. .................... 370/335
2011/0113433 A1* 5/2011 Koyanagi et al. ............. 718/104

FOREIGN PATENT DOCUMENTS

EP    1 554 894 A2    7/2005
JP    2006 502623     1/2006

OTHER PUBLICATIONS

Kishiyama, Initial Views on Non-orthogonal Multiple Access Based Radio Interface for Future Radio Access, IEICE, Jul. 14, 2011.*
3GPP ETSI TS 136 212, V10.2.0, Jun. 2011.*
Kishiyama, Y. et al., "Initial Views on Non-orthogonal Multiple Access Based Radio Interface for Future Radio Access", IEICE Technical Report, the Institute of Electronics, Information and Communication Engineers, vol. 111, No. 145, pp. 37-42, (Jul. 14, 2011) (with partial English translation).

(Continued)

*Primary Examiner* — German J Viana Di Prisco
(74) *Attorney, Agent, or Firm* — Oblon, McClelland, Maier & Neustadt, L.L.P.

(57) ABSTRACT

A mobile station is classified into one of plural classes based on the reception quality from a base station. The allocations of resource blocks are executed at the base station so that a resource block used for the transmission of a data signal component for a mobile station in a class is not commonly used as a resource block for the transmission of a data signal component for another mobile station belonging to the same class but is commonly used as a resource block used for the transmission of a data signal component for a mobile station belonging to another class. A mobile station, based on the allocation of resource blocks, demodulates a data signal component corresponding to the mobile station after cancelling a data signal component corresponding to a low-quality mobile station.

6 Claims, 11 Drawing Sheets

(56) References Cited

OTHER PUBLICATIONS

3 GPP TS 36.300 V8.12.0; $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN), Total 149 Pages, (Mar. 2010).

3 GPP TS 36..300 V10.4.0; $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN), Total 194 Pages, (Jun. 2011).

Tse, D. et al., "Fundamentals of Wireless Communication", Chapter 6, Cambridge University Press, Total 64 Pages, (2005).

ETSI TS 136.212 V10.2.0, Evolved Universal Terrestrial Radio Access (E-UTRA); Multiplexing and channel coding (Jun. 2011).

International Search Report Issued Dec. 4, 2012 in PCT/JP12/072856 Filed Sep. 7, 2012.

Japanese Office Action Issued Nov. 26, 2013 in Japanese Application No. 2011-196616 Filed Sep. 9, 2011 (with English translation).

Extended European Search Report issued Mar. 27, 2015 in Patent Application No. 12829735.5.

* cited by examiner

FIG. 11

| MOBILE STATION RESOURCE BLOCK ALLOCATION INFORMATION UAI | UE-ID OF MOBILE STAION | UE-ID OF LOW-QUALITY MOBILE STATION |
|---|---|---|

DCI

REMOVING INTERFERENCE IN NON-ORTHOGONAL RADIO ACCESS

FIELD OF THE INVENTION

The present invention relates to a radio communication system, a base station, a mobile station, and a communication control method.

BACKGROUND ART

A radio communication standard such as LTE (Long Term Evolution) and LTE-Advanced for enabling the high-speed and large-capacity radio access has recently been proposed in order to cope with the increase in the wireless data traffic in a mobile communication network (e.g., Non-patent Document 1, Non-patent Document 2). In a forward link radio access in LTE and in LTE-Advanced, data channels for transmitting data signals to each unit of user equipment are orthogonal in a frequency domain or in a time domain. Therefore, the interference between data channels for each unit of user equipment is controlled.

For example, in an orthogonal radio access in a frequency domain shown in FIG. 1, frequency bandwidths allocated to each mobile station UE (UE-A, UE-B, UE-C) are orthogonal to each other, so that the interference is controlled. Each mobile station UE demodulates only the frequency bandwidth allocated to the mobile station UE itself, thereby obtaining a radio signal for the mobile station UE.

PRIOR ART DOCUMENTS

Non-Patent Documents

Non-patent document 1 3GPP TS 36.300 V8.12.0; 3rd Generation Partnership Project; Technical Specification Group Radio Access Network; Evolved Universal Terrestrial Radio Access (E-UTRA) and Evolved Universal Terrestrial Radio Access Network (E-UTRAN) (2010-03)
Non-patent Document 2 3GPP TS 36.300 V 10.4.0; 3rd Generation Partnership Project; Technical Specification Group Radio Access Network; Evolved Universal Terrestrial Radio Access (E-UTRA) and Evolved Universal Terrestrial Radio Access Network (E-UTRAN) (2011-06)

SUMMARY OF THE INVENTION

Problems to be Solved by the Invention

According to the orthogonal radio access system, because a radio resource (e.g., frequency bandwidth) allocated to each mobile station UE is occupied by a single mobile station UE, sufficient frequency efficiency sometimes cannot be obtained even if there is no interference from another mobile station UE.

On the other hand, as shown in FIG. 2, in a non-orthogonal radio access system in which a radio resource (frequency bandwidth) is shared by plural mobile stations UE, in order for a mobile station UE (e.g., mobile station UE-C) to obtain a radio signal for mobile station UE, it is sometimes necessary to remove interference from radio signals for other mobile stations UE (e.g., mobile station UE-A and mobile station UE-B).

In consideration of the above, the present invention has, as an object, to enable the effective removal of, from a radio signal, an interference to a desired radio signal component by a radio signal component for another mobile station while enhancing frequency efficiency in a forward radio communication by using the non-orthogonal radio access system.

A radio communication system according to the present invention has: plural mobile stations; and a base station for wirelessly communicating with each of the plural mobile stations by using a resource block corresponding to a predetermined time period and to a frequency bandwidth, the base station has: a mobile station classifier that classifies each of the mobile stations into one of plural classes based on the reception quality from the base station; a resource block allocator that allocates resource blocks to the plural mobile stations so that a resource block used for transmission of a data signal component to a mobile station in a class is not commonly used as a resource block used for transmission of a data signal component to another mobile station belonging to the same class, but is commonly used as a resource block used for transmission of a data signal component to another mobile station belonging to another class; a data signal component generator that generates plural data signal components to be transmitted to the plural mobile stations; a control signal generator that generates a control signal containing information indicating the allocation of the resource blocks by the resource block allocator to the plural mobile stations; and a transmitter that is an element that transmits the plural data signal components generated by the data signal component generator and the control signal generated by the control signal generator, the transmitter being configured to transmit the data signal components in accordance with the allocation of the resource blocks by the resource block allocator, a data signal component, from among the data signal components, being transmitted to a mobile station with an inferior reception quality from the base station with a greater transmission power; and each of the plural mobile stations has: a receiver that receives a data signal for which the plural data signal components have been combined, the data signal being transmitted from the transmitter of the base station, and the control signal transmitted from the transmitter of the base station; and a data signal demodulator that, when the data signal received by the receiver of the mobile station includes a data signal component corresponding to a low-quality mobile station, the low-quality mobile station being a mobile station in a low-quality class that is a class for which the reception quality from the base station is inferior to a class to which the mobile station belongs, demodulates a data signal component corresponding to the mobile station after demodulating and cancelling the data signal component corresponding to the low-quality mobile station.

According to the above configuration, because information indicating the allocation of resource blocks by the resource block allocator is transmitted to a mobile station, the mobile station is able to cancel data signal components other than a desired component from a data signal for which data signal components for plural mobile stations are superposed.

According to a preferred embodiment of the present invention, the resource block allocator of the base station executes the allocation of the resource blocks to the plural mobile stations so that a resource block allocated to a mobile station in a class for which the reception quality from the base station is inferior is used commonly as a resource block allocated to one or more mobile stations in a class for which the reception quality from the base station is superior and so that all of one or more resource blocks allocated to a mobile station in a class for which the reception quality from the base station is superior is commonly used as a resource block allocated to a mobile station in a class for which the reception quality from the base station is inferior; the control signal generator of the base station generates the control signal by multiplexing plural control elements, the control elements corresponding one-to-one to the plural mobile stations, with each control element containing (a) mobile station resource block allocation information indicating the allocation of a resource block used for transmission of a data signal component to a mobile station, (b) low-quality mobile station identification information indicating a low-quality mobile station to which the same resource block as the resource block allocated to the mobile station is allocated, the low-quality mobile station being a low-quality mobile station in a low-quality class adjacent to the class to which the mobile station belongs, and (c) mobile-station-self-identification information identifying the mobile station; and the low-quality mobile station identification information contained in a control element corresponding to a mobile station in a class for which the reception quality from the base station is the most inferior indicates that there is no low-quality mobile station for the mobile station, and each of the plural mobile stations further has: a control signal first demodulator that demodulates a control element corresponding to the mobile station out of the control signal received by the receiver of the mobile station by using mobile-station-self-identification information of the mobile station; and a control signal second demodulator that executes demodulating, by using low-quality mobile station identification information contained in the demodulated control element, a control element, out of the control signal, corresponding to a low-quality mobile station indicated by the low-quality mobile station identification information until a control element containing low-quality mobile station identification information indicating that there is no low-quality mobile station is demodulated, and the data signal demodulator of the mobile station uses the control element corresponding to the mobile station, to demodulate the data signal component corresponding to the mobile station, after demodulating and cancelling a data signal component corresponding to the low-quality mobile station by using the control element corresponding to the low-quality mobile station.

According to the above configuration, all of the one or more resource blocks allocated to one mobile station in a class in which the reception quality from the base station is superior is commonly used as a resource block allocated to one mobile station in a class in which the reception quality from the base station is inferior. As a result, a mobile station, in canceling, from a radio signal (data signal), a data signal component for which the transmission power is greater, prior to demodulating and decoding a data signal component destined for itself, only has to cancel a data signal component for only a single mobile station for each low-quality class. Thus, the number of cancellations necessary prior to demodulating and decoding the data signal component destined for itself is suppressed, and therefore, the effective cancellation of interference components is enabled.

Furthermore, each control element includes low-quality mobile station identification information indicating a low-quality mobile station which is a low-quality mobile station included in a low-quality class adjacent to a class to which a mobile station corresponding to the control element belongs, and the same resource block allocated to the mobile station is allocated to the low-quality mobile station. Therefore, even though information regarding the allocation of resource blocks to another mobile station is not directly notified, it is possible to know which data signal component is to be cancelled and the order in which it is canceled if the mobile station about to execute demodulation and decoding of the data signal component for itself traces a low-quality mobile station contained in the control element in order. According to the above configuration, regardless of the number of low-quality mobile stations, because each control element contains only one piece of low-quality mobile station identification information, it is possible to make the size of the control element be a fixed length. Therefore, the configuration of control signals is simpler, and the overhead of the control signal process at mobile stations can be additionally reduced.

According to a preferred embodiment of the present invention, the control signal generator of the base station generates the control signal so that the control element corresponding to a mobile station for which the reception quality from the base station is inferior has a higher redundancy.

According to the above configuration, even a mobile station for which the reception quality from the base station is inferior (e.g., distant from the base station) is able to receive a control element with an improved quality in comparison with a configuration in which the redundancy of the control element is fixed.

According to a preferred embodiment of the present invention, in the radio communication system, the mobile station is identifiable by using mobile station distinction information including a common part indicating a set of mobile stations to which all or a part of resource blocks to be allocated to a mobile station in a class for which the reception quality from the base station is the most inferior and an individual part indicating each mobile station included in the set of the mobile stations; each of the plural mobile stations is notified in advance of the common part from the base station; and the control signal generator of the base station generates the control signal by multiplexing the plural control elements, each of the control elements containing the individual part as the low-quality mobile station identification information, and the control signal second demodulator of the mobile station uses the common part stored in the mobile station and the individual part contained in the demodulated control element, to demodulate the control element corresponding to the low-quality mobile station indicated by the common part and the individual part.

According to the above configuration, because the amount of information mounted on a control element is reduced in comparison with a configuration including the common part and the individual part in a control element, the processing burden at mobile stations can be additionally reduced.

A base station according to the present invention is a base station in a radio communication system including: plural mobile stations; and a base station for wirelessly communicating with each of the plural mobile stations by using a resource block corresponding to a predetermined time period and to a frequency bandwidth, the base station having: a mobile station classifier that classifies each of the mobile stations into one of plural classes based on the reception quality from the base station; a resource block allocator that allocates resource blocks to the plural mobile stations so that a resource block used for transmission of a data signal component to a mobile station in a class is not commonly used as a resource block used for transmission of a data signal component to another mobile station belonging to the same class but is commonly used as a resource block used for transmission of a data signal component to another mobile station belonging to another class; a data signal component generator that generates plural data signal components to be transmitted to the plural mobile stations; a control signal generator that generates a control signal containing information indicating the allocation of the resource blocks by the resource block allocator to the plural mobile stations; and a transmitter that is an element that transmits the plural data signal components generated by the data signal component generator and the control signal generated by the control signal generator, the transmitter being configured to transmit the data signal components in accordance with the allocation of the resource blocks by the resource block allocator, a data signal component, from among the data signal components, being transmitted to a mobile station with an inferior reception quality from the base station with a greater transmission power.

According to a preferred embodiment of the present invention, the resource block allocator of the base station executes the allocation of the resource blocks to the plural mobile stations so that a resource block allocated to a mobile station in a class for which the reception quality from the base station is inferior is used commonly as a resource block allocated to one or more mobile stations in a class for which the reception quality from the base station is superior and so that all of one or more resource blocks allocated to a mobile station in a class for which the reception quality from the base station is superior is commonly used as a resource block allocated to a mobile station in a class for which the reception quality from the base station is inferior; the control signal generator generates the control signal by multiplexing plural control elements, the control elements corresponding one-to-one to the plural mobile stations, with each control element containing (a) mobile station resource block allocation information indicating the allocation of a resource block used for transmission of a data signal component to a mobile station, (b) low-quality mobile station identification information indicating a low-quality mobile station to which the same resource block as the resource block allocated to the mobile station is allocated, the low-quality mobile station being a low-quality mobile station in a low-quality class adjacent to the class to which the mobile station belongs, out of low-quality mobile stations being mobile stations in a low-quality class for which the reception quality from the base station is inferior in comparison to the class to which the mobile station belongs, and (c) mobile-station-self-identification information identifying the mobile station; and the low-quality mobile station identification information contained in a control element corresponding to a mobile station in a class for which the reception quality from the base station is the most inferior indicates that there is no low-quality mobile station for the mobile station.

A mobile station according to the present invention is a mobile station in a radio communication system including: plural mobile stations; and a base station for wirelessly communicating with each of the plural mobile stations by using a resource block corresponding to a predetermined time period and to a frequency bandwidth and for classifying each of the mobile stations into one of plural classes based on the reception quality from the base station itself, the mobile station having: a receiver that receives a data signal and a control signal transmitted from the base station, the data signal including a data signal component for the mobile station and a data signal component for another mobile station being superposed, and the control signal including information indicating the allocation, by the base station, of resource blocks to the plural mobile stations; and a data signal demodulator that, when the data signal received by the receiver of the mobile station includes a data signal component corresponding to a low-quality mobile station, the low-quality mobile station being a mobile station in a low-quality class that is a class for which the reception quality from the base station is inferior to a class to which the mobile station belongs, demodulates a data signal component corresponding to the mobile station after demodulating and cancelling the data signal component corresponding to the low-quality mobile station.

According to a preferred embodiment of the present invention, the control signal includes plural control elements being multiplexed, the control elements corresponding one-to-one to the plural mobile stations, with each control element containing (a) mobile station resource block allocation information indicating the allocation of a resource block used for transmission of a data signal component to a mobile station, (b) low-quality mobile station identification information indicating a low-quality mobile station to which the same resource block as the resource block allocated to the mobile station is allocated, the low-quality mobile station being a low-quality mobile station in a low-quality class adjacent to the class to which the mobile station belongs, and (c) mobile-station-self-identification information identifying the mobile station; and the low-quality mobile station identification information contained in a control element corresponding to a mobile station in a class for which the reception quality from the base station is the most inferior indicates that there is no low-quality mobile station for the mobile station, and the mobile station additionally having: a control signal first demodulator that demodulates a control element corresponding to the mobile station out of the control signal received by the receiver of the mobile station by using mobile-station-self-identification information of the mobile station; and a control signal second demodulator that executes demodulating, by using low-quality mobile station identification information contained in the demodulated control element, a control element, out of the control signal, corresponding to a low-quality mobile station indicated by the low-quality mobile station identification information until a control element containing low-quality mobile station identification information indicating that there is no low-quality mobile station demodulated, and the data signal demodulator of the mobile station uses the control element corresponding to the mobile station, to demodulate the data signal component corresponding to the mobile station, after demodulating and cancelling a data signal component corresponding to the low-quality mobile station by using the control element corresponding to the low-quality mobile station.

A communication control method according to the present invention is a communication control method in a radio communication system including: plural mobile stations; and a base station for wirelessly communicating with each of the plural mobile stations by using a resource block corresponding to a predetermined time period and to a frequency bandwidth, the method including: classifying, at the base station, each of the mobile stations into one of plural classes based on the reception quality from the base station; allocating, at the base station, resource blocks to the plural mobile stations so that a resource block used for transmission of a data signal component to a mobile station in a class is not commonly used as a resource block used for transmission of a data signal component to another mobile station belonging to the same class but is commonly used as a resource block used for transmission of a data signal component to another mobile station belonging to another class; generating, at the base station, plural data signal components to be transmitted to the plural mobile stations; generating, at the base station, a control signal containing information indicating the allocation of the resource blocks to the plural mobile stations; in transmitting the plural data signal components and the control signal, transmitting, from the base station, the data signal components in accordance with the allocation of the resource blocks, a data signal component, from among the data signal components, being transmitted to a mobile station with an inferior reception quality from the base station with a greater transmission power; receiving, at the mobile station, a data signal for which the plural data signal components have been combined, the data signal being transmitted from the base station, and the control signal transmitted from the base station; and when the data signal received by the mobile station includes a data signal component corresponding to a low-quality mobile station, the low-quality mobile station being a mobile station in a low-quality class that is a class for which the reception quality from the base station is inferior to a class to which the mobile station belongs, demodulating, at the mobile station, a data signal component corresponding to the mobile station after demodulating and cancelling the data signal component corresponding to the low-quality mobile station.

According to a preferred embodiment of the present invention, the method additionally includes executing, at the base station, the allocation of the resource blocks to the plural mobile stations so that a resource block allocated to a mobile station in a class for which the reception quality from the base station is inferior is used commonly as a resource block allocated to one or more mobile stations in a class for which the reception quality from the base station is superior and so that all of one or more resource blocks allocated to a mobile station in a class for which the reception quality from the base station is superior is commonly used as a resource block allocated to a mobile station in a class for which the reception quality from the base station is inferior; and generating, at the base station, the control signal by multiplexing plural control elements, the control elements corresponding one-to-one to the plural mobile stations, with each control element containing (a) mobile station resource block allocation information indicating the allocation of a resource block used for transmission of a data signal component to a mobile station, (b) low-quality mobile station identification information indicating a low-quality mobile station to which the same resource block as the resource block allocated to the mobile station is allocated, the low-quality mobile station being a low-quality mobile station in a low-quality class adjacent to the class to which the mobile station belongs, and (c) mobile-station-self-identification information identifying the mobile station, and the low-quality mobile station identification information contained in a control element corresponding to a mobile station in a class for which the reception quality from the base station is the most inferior indicates that there is no low-quality mobile station for the mobile station, and the method additionally includes: demodulating, at the mobile station, a control element corresponding to the mobile station out of the control signal received by the mobile station by using mobile-station-self-identification information of the mobile station; demodulating, at the mobile station, by using low-quality mobile station identification information contained in the demodulated control element, a control element, out of the control signal, corresponding to a low-quality mobile station indicated by the low-quality mobile station identification information until a control element containing low-quality mobile station identification information indicating that there is no low-quality mobile station is demodulated; and using, at the mobile station, the control element corresponding to the mobile station, to demodulate the data signal component corresponding to the mobile station, after demodulating and cancelling a data signal component corresponding to the low-quality mobile station by using the control element corresponding to the low-quality mobile station.

BRIEF DESCRIPTION OF THE DRAWINGS

FIG. 11 is a diagram showing a configuration example of forward link control information of the first embodiment of the present invention.

DESCRIPTION OF EMBODIMENTS

First Embodiment
(1) Overview of Radio Communication System

Figure 3:
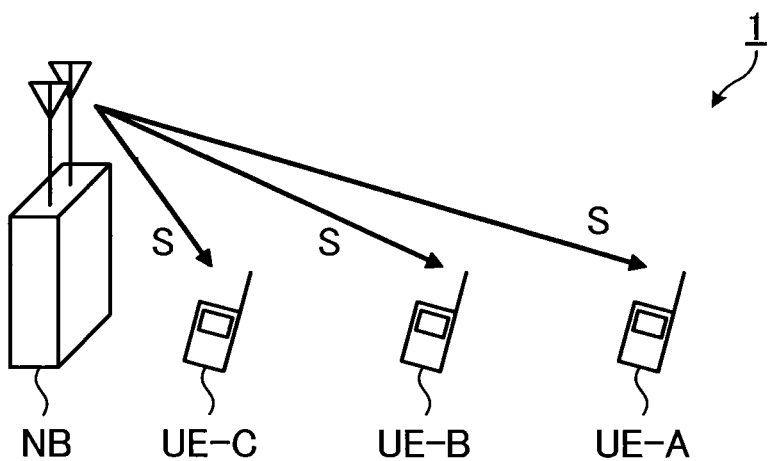
FIG. 3 is a schematic diagram of a radio communication system according to a first embodiment of the present invention.

FIG. 3 is a schematic diagram of a radio communication system according to an embodiment of the present invention. A radio communication system 1 has a base station NB, plural mobile stations UE (UE-A, UE-B, and UE-C). Base station NB transmits a radio signal S to mobile station UE located in a cell (not shown) formed by base station NB itself. For simplicity, only one base station NB is shown, but it should be understood as a matter of course that radio communication system 1 can include plural base stations NB.

Each communication element (base station NB, mobile station UE, etc.) in radio communication system 1 performs radio communication in accordance with a predetermined radio access technology (e.g., LTE). In the present embodiment, description will be given of radio communication system 1 operating in accordance with the LTE, but this is not to limit the technical scope of the present invention. The present invention can be applied to other radio access technology (e.g., WiMAX prescribed in the IEEE 802.16 series) if necessary design changes are made.

Figure 4:
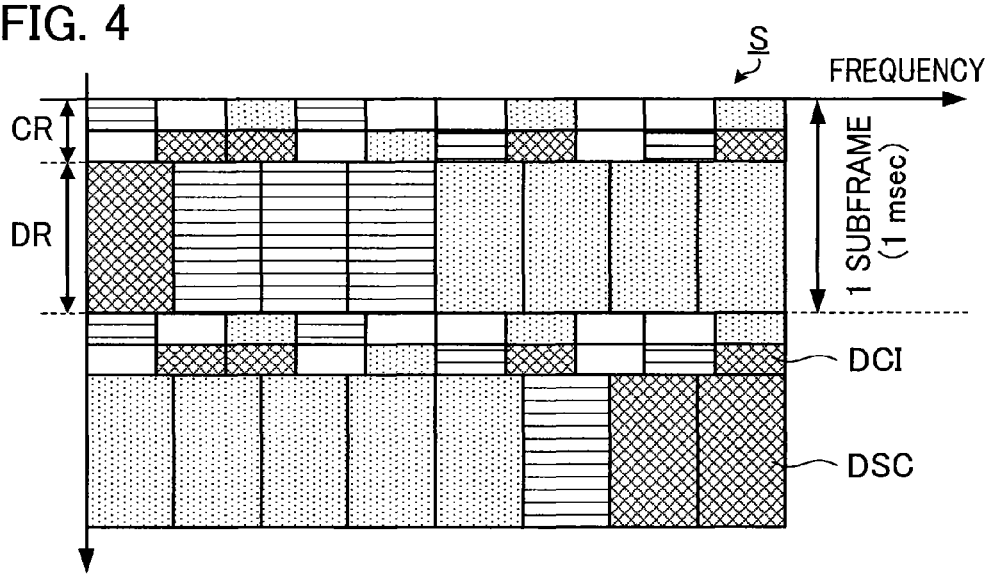
FIG. 4 is a diagram showing examples of radio signals a base station transmits to a mobile station according to the first embodiment of the present invention.

FIG. 4 shows examples of a radio signal S that base station NB transmits to mobile station UE. In FIG. 4, the vertical axis shows time, and the horizontal axis shows frequency. Radio signal S includes a control region CR in which a control signal CS is transmitted and a data region DR in which a data signal DS is transmitted. Control region CR is also referred to as a forward link control channel (Physical Downlink Control Channel, PDCCH), and data region DR is also referred to as a forward link common channel (Physical Downlink Shared Channel, PDSCH). Radio signal S is sectioned into subframe (1 ms) units, and control region CR and data region DR are included in each subframe.

Control signal CS includes plural pieces of forward link control information (Downlink Control Information) DCI corresponding respectively to individual mobile stations UE, and data signal DS includes plural data signal components DSC corresponding respectively to individual mobile stations UE, which will be described later in detail. Mobile station UE demodulates and decodes data signal component DSC corresponding to mobile station UE itself based on allocation information included in forward link control information DCI corresponding to mobile station UE itself. For this reason, prior to the demodulating and decoding of data signal component DSC, mobile station UE needs to demodulate and decode forward link control information DCI corresponding to the data signal component DSC.

Plural pieces of forward link control information DCI are never transmitted with a common frequency bandwidth (i.e., never superposed), but plural data signal components DSC are sometimes transmitted with a common frequency bandwidth (i.e., can be superposed). To simplify the diagram, FIG. 4 shows an example in which plural data signal components DSC are not superposed in each partition of data region DR.

(2) Non-Orthogonal Radio Access

Figure 1:
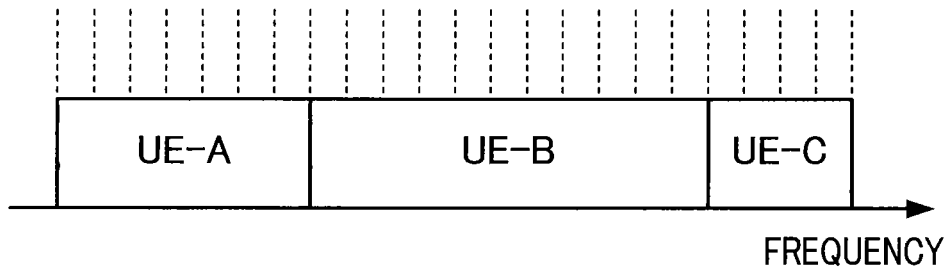
FIG. 1 is a diagram showing an example of an orthogonal radio access in the frequency domain.
Figure 2:
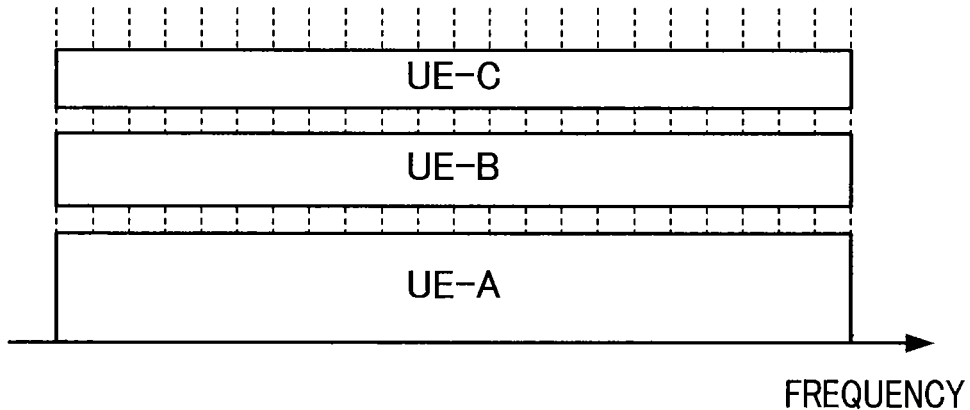
FIG. 2 is a diagram showing an example of a non-orthogonal radio access in the frequency domain.

In radio communication system 1, a resource block RB unit corresponding to a predetermined time duration (e.g., 1 ms) and a predetermined frequency bandwidth (e.g., 180 kHz) is used to allocate radio resources (time duration and frequency bandwidth) used for radio communication between base station NB and mobile stations UE. Also, base station NB of the present embodiment, as in FIG. 2, transmits radio signal S (data signal DS) to plural mobile stations UE with a common frequency bandwidth. That is, base station NB is capable of superposing plural data signal components DSC to be transmitted to plural mobile stations UE in each resource block RB for transmission. In other words, base station NB is capable of executing radio communication using plural resource blocks RB that are not orthogonal to each other (i.e., non-orthogonal).

Figure 5:
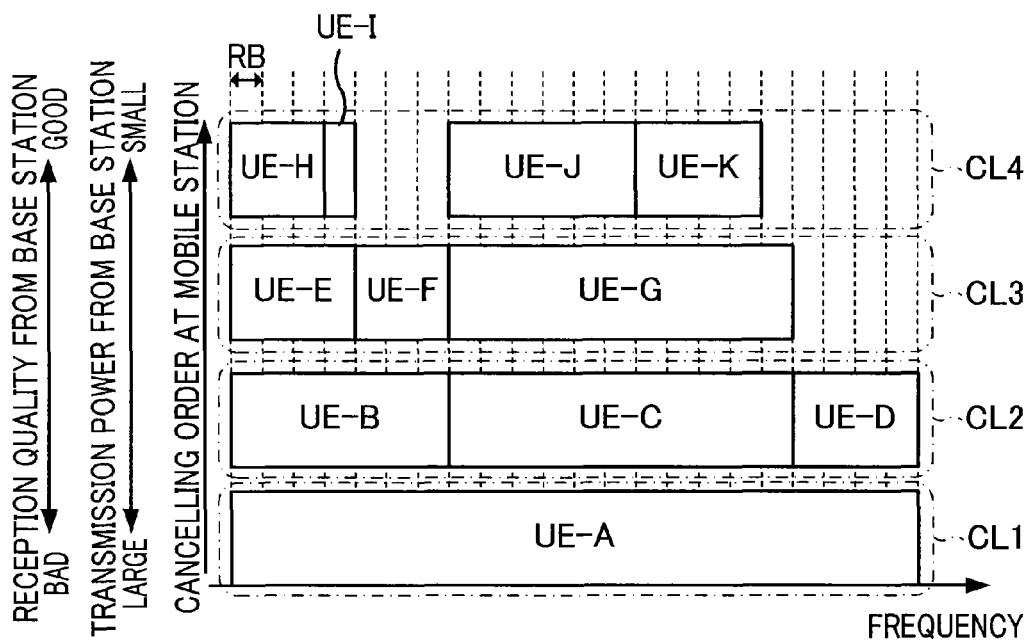
FIG. 5 is a diagram illustrating plural data signal components superposed in resource blocks used in the radio communication system.

FIG. 5 is a diagram illustrating plural data signal components DSC superposed in plural resource blocks RB. In FIG. 5, the horizontal axis shows frequency. A region sectioned by vertical dot lines indicates one resource block RB. Each box indicates data signal component DSC (e.g., data signal component DSC-A) for mobile station UE (e.g., mobile station UE-A) denoted in each box. Specifically, in FIG. 5, plural data signal components DSC are superposed in each resource block RB. For example, in resource block RB at the leftmost in FIG. 5, a data signal component DSC-A for mobile station UE-A, a data signal component DSC-B for mobile station UE-B, a data signal component DSC-E for a mobile station UE-E, and a data signal component DSC-H for a mobile station UE-H are superposed.

In FIG. 5, each box (therefore, each mobile station UE) is classified into one of classes CL in accordance with its position along the vertical axis. Specifically, mobile station UE-A is classified in a first class CL1; mobile stations UE-B to UE-D are classified in a second class CL2; mobile stations UE-E to UE-G are classified in a third class CL3; and mobile stations UE-H to UE-K are classified in a fourth class CL4.

The vertical axis of FIG. 5 shows reception quality from base station NB, transmission power from base station NB, and the order in which data signal component DSC is cancelled at mobile station UE (data signal component DSC cancellation will be described later). Specifically, mobile station UE in a higher class CL has superior reception quality from base station NB; and mobile station UE in a lower class CL has inferior reception quality from base station NB. For example, mobile station UE-H in fourth class CL4 has the most superior reception quality from base station NB, and the reception quality from base station NB is inferior in the order mobile station UE-E in third class CL3, mobile station UE-B in second class CL2, and then mobile station UE-A in first class CL1 (i.e., mobile station UE-A in first class CL1 has the most inferior reception quality from base station NB). In the following, for the sake of simplicity, class CL (e.g., first class CL1, second class CL2, or third class CL3) for which reception quality from base station NB is inferior in comparison with class CL (e.g., fourth class CL4) to which mobile station UE belongs to is sometimes referred to as a low-quality class LCL, and mobile station UE in low-quality class LCL is sometimes referred to as a low-quality mobile station LUE.

Therefore, preferably, data signal component DSC is transmitted from base station NB with less transmission power for mobile station UE in a higher class CL (i.e., class CL for which the reception quality from base station NB is superior); and, preferably, data signal component DSC is transmitted from base station NB with a greater transmission power for mobile station UE in a lower class CL (i.e., class CL for which the reception quality from base station NB is inferior).

The reception quality of radio waves tends to be higher for mobile station UE closer to base station NB, and the reception quality of radio waves tends to be lower for mobile station UE that is more distant from base station NB. In consideration of this, it is also preferable to transmit data signal component DSC from base station NB with a less transmission power for mobile station UE closer to base station NB and to transmit data signal component DSC from base station NB with a greater transmission power for mobile station UE that is more distant from base station NB.

In FIG. 5, resource block RB allocated to one mobile station UE in a class CL for which the reception quality from base station NB is inferior is commonly used as resource block RB allocated to one or more mobile stations UE in class CL for which the reception quality from base station NB is superior (e.g., resource block RB allocated to mobile station UE-A in first class CL1 is also allocated to mobile station UE-B, mobile station UE-C, and mobile station UE-D in second class CL2 for which the reception quality from base station NB is superior). Also, all of resource blocks RB allocated to one mobile station UE in class CL for which the reception quality from base station NB is superior is commonly used as resource blocks RB allocated to one mobile station UE in class CL for which the reception quality from base station NB is inferior (e.g., all of resource blocks RB allocated to mobile station UE-H in fourth class CL4 are allocated to mobile station UE-E in third class CL3, which is low-quality class LCL).

Figure 6:
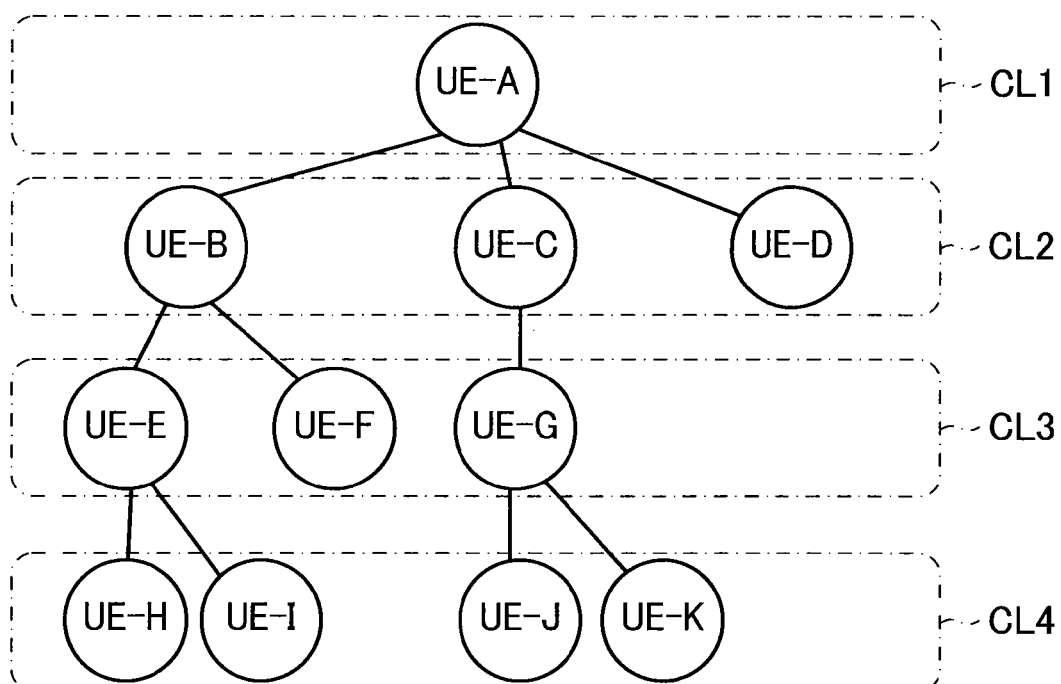
FIG. 6 is a diagram showing relationships of inclusion (tree structure) of resource blocks allocated to each mobile station.

Accordingly, the relationships of inclusion of resource blocks RB allocated to each mobile station UE in FIG. 5 form a tree structure shown in FIG. 6. In the tree structure of FIG. 6, each node (each mobile station UE in second class CL2 to fourth class CL4) except for a root node (mobile station UE-A in first class CL1) has only one node of a class that is one level above (parent node) (hereinafter, sometimes referred to as an adjacent low-quality class ALCL). It is to be understood as a matter of course that the above tree structure can vary depending on the number of mobile stations UE wirelessly connected to base station NB and the reception quality.

(3) Demodulating, Decoding, and Canceling Data Signal Component

Figure 7:
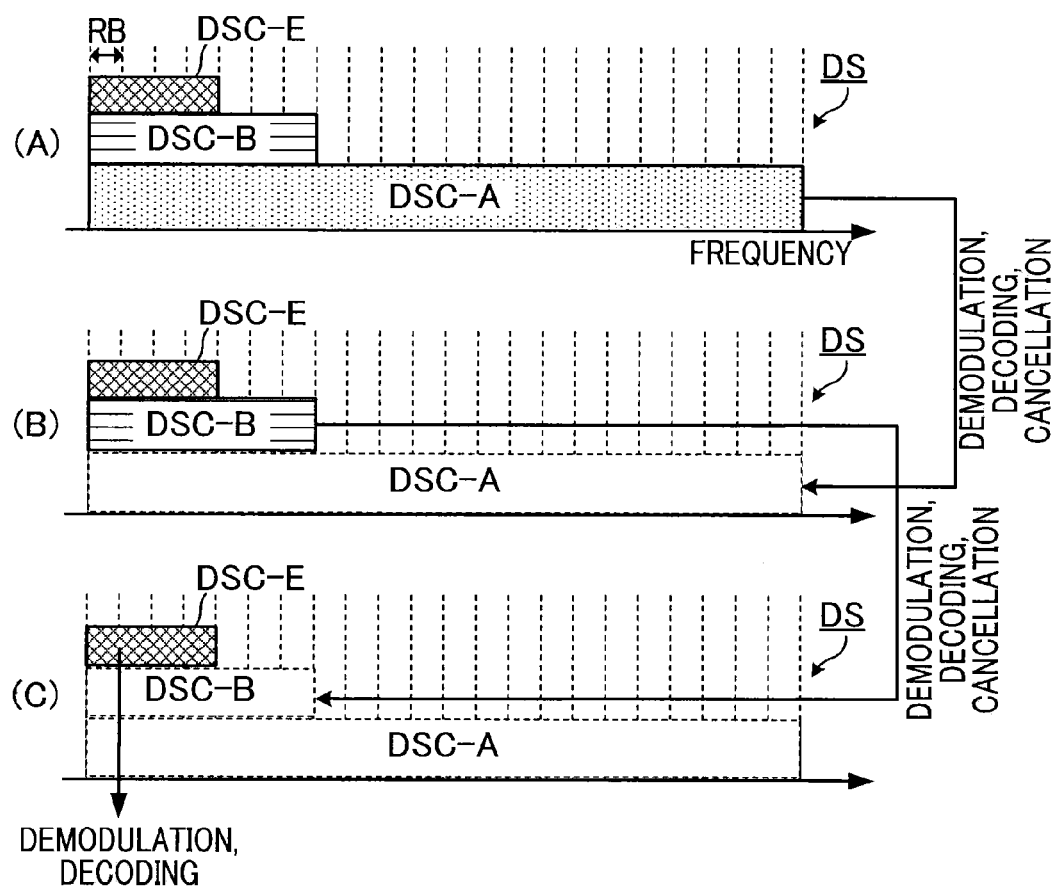
FIG. 7 is a diagram showing how data signal components are demodulated, decoded, and cancelled in the first embodiment of the present invention.

FIG. 7 is a diagram showing how data signal components DSC are demodulated, decoded, and canceled in the present embodiment. In FIG. 7, we assume that data signal component DSC-A for mobile station UE-A, data signal component DSC-B for mobile station UE-B, and data signal component DSC-E for mobile station UE-E are superposed in a common resource block RB, to be transmitted as a data signal DS. In FIG. 7, the horizontal axis shows frequency, and the vertical axis shows the amount of transmission power from base station NB for each data signal component DSC. The transmission power for data signal component DSC-A is the greatest, the transmission power for data signal component DSC-B is the next greatest, and the transmission power for data signal component DSC-E is the least.

Because the transmission power for data signal component DSC-A is the greatest, the interference from data signal component DSC-B and data signal component DSC-E for which the transmission power is less is relatively small. Therefore, mobile station UE-A can demodulate and decode data signal component DSC-A without cancelling data signal component DSC-B and data signal component DSC-E.

Because the transmission power for data signal component DSC-B is the next greatest, the interference from data signal component DSC-E for which the transmission power is less is relatively small, but the interference from data signal component DSC-A for which the transmission power is greater is relatively large. Therefore, mobile station UE-B, prior to demodulating and decoding data signal component DSC-B, cancels data signal component DSC-A superposed with data signal component DSC-B. There is no need to cancel data signal component DSC-E for which the transmission power is less.

Because the transmission power of data signal component DSC-E is the lowest, the interference from data signal component DSC-A and data signal component DSC-B for which the transmission power is greater is relatively large. Therefore, mobile station UE-E, prior to demodulating and decoding data signal component DSC-E, cancels data signal component DSC-A and data signal component DSC-B superposed with data signal component DSC-E.

Specific description is given of an operation of mobile station UE-E. Mobile station UE-E first demodulates and decodes data signal component DSC-A included in data signal DS for which data signal component the transmission power is the greatest, to cancel data signal component DSC-A from data signal DS (the section (A) then to the section (B) of FIG. 7). Subsequently, mobile station UE-E demodulates and decodes data signal component DSC-B for which the transmission power is the next greatest, to cancel data signal component DSC-B from data signal DS (the section (B) then to the section (C) of FIG. 7). Then, mobile station UE-E demodulates and decodes data signal component DSC-E (the section (C) of FIG. 7). Data for itself is thus obtained by mobile station UE-E.

Cancellation of data signal component DSC can be executed in a freely selected, publicly known method. For example, the cancellation is preferably executed according to a method described in Chapter 6, "Fundamentals of Wireless Communication" (D. Tse and P. Viswanath, Cambridge University Press, May 2005).

As described above, in demodulating and decoding data signal component DSC, it is preferable to cancel another data signal component DSC for which the transmission power is greater and which is superposed in the same resource block RB as that in which data signal component DSC to be demodulated and decoded is superposed. Therefore, in FIG. 5, it is understood that data signal component DSC is preferably cancelled in order from mobile station UE corresponding to data signal component DSC for which the transmission power is greater, i.e., mobile station UE in a lower class CL (low-quality class LCL for which the reception quality from base station NB is inferior).

(4) Summary

In the present embodiment, all of one or more resource blocks RB allocated to one mobile station UE in a class CL for which the reception quality from base station NB is superior is commonly used as resource block RB allocated to one mobile station UE in a class CL for which the reception quality from base station NB is inferior (i.e., low-quality class LCL). As a result, mobile station UE, in canceling, from radio signal S (data signal DS), data signal component DSC for which the transmission power is greater (i.e., data signal component DSC for mobile station UE in low-quality class LCL) prior to demodulating and decoding data signal component DSC destined for itself, only has to cancel data signal component DSC for only a single mobile station UE for each low-quality class LCL.

For example, mobile station UE-H in fourth class CL4 in FIG. 5, in demodulating and decoding data signal component DSC-H destined for itself, only has to cancel data signal component DSC-A for mobile station UE-A for first class CL1, cancel data signal component DSC-B for mobile station UE-B for second class CL2, and cancel data signal component DSC-E for mobile station UE-E for third class CL3. Executing the above cancellation enables an interference component to data signal component DSC-H destined for itself to be removed, and enables data signal component DSC-H to be demodulated and decoded.

Figure 15:
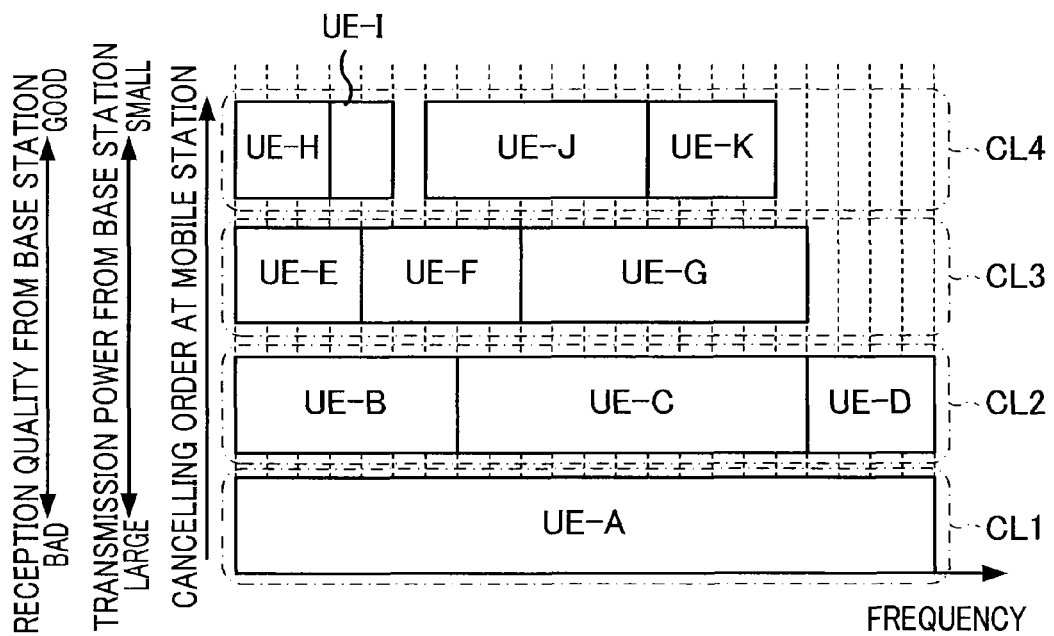
FIG. 15 is a diagram illustrating plural data signal components superposed in resource blocks according to a modification of the present invention.

Therefore, in comparison with a configuration in which mobile station UE might have to cancel data signal components DSC for two or more mobile stations UE for each low-quality class LCL (e.g., in a configuration shown in FIG. 15, mobile station UE-F in third class CL3 needs to cancel data signal components DSC (DSC-B and DSC-C) for mobile station UE-B and mobile station UE-C for second class CL2), the number of cancellations necessary prior to demodulating and decoding data signal component DSC destined for itself is suppressed. Therefore, the effective cancellation of interference components is enabled.

In the following, description will be given of a specific configuration for implementing the above-described allocation of resource blocks RB and demodulation, decoding and cancellation of data signal component DSC.

(5) Configuration of Base Station

Figure 8:
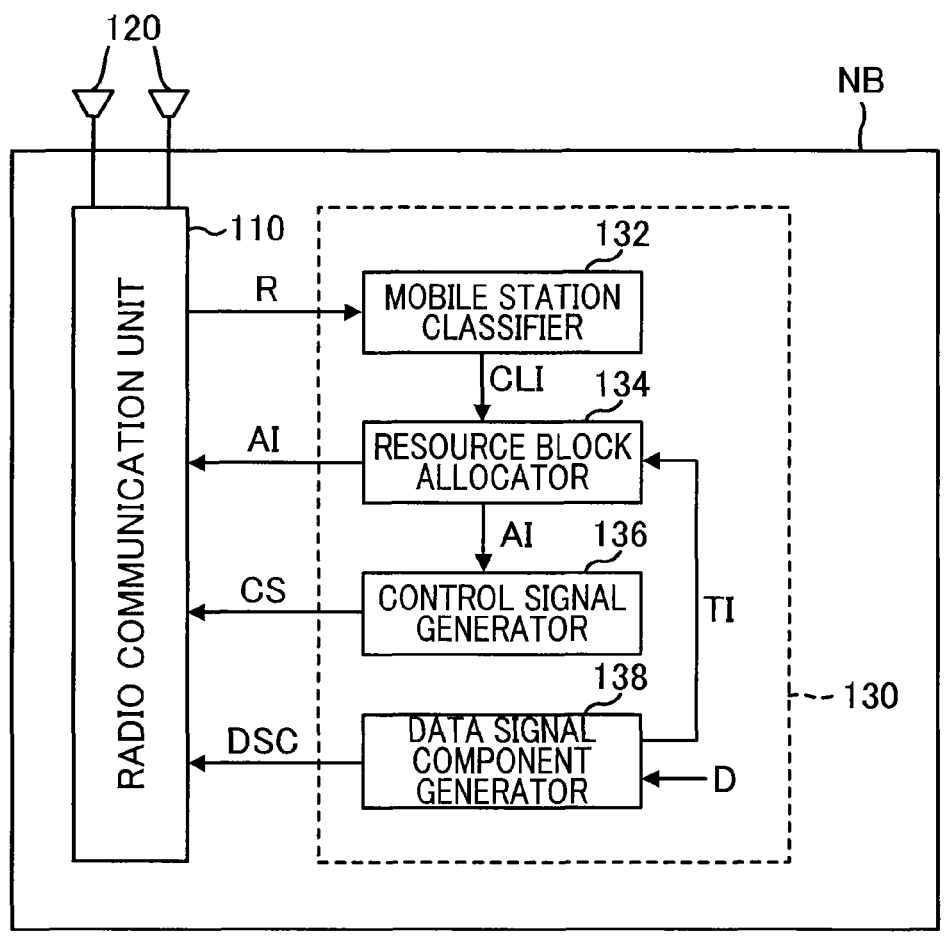
FIG. 8 is a block diagram showing a configuration of the base station in the first embodiment of the present invention.

FIG. 8 is a block diagram showing a configuration of base station NB according to an embodiment of the present invention. Base station NB has a radio communication unit 110 and a controller 130.

Radio communication unit 110 is an element for executing radio communication of each mobile station UE, and includes a transmitter-receiver antenna 120, a reception circuit that receives radio waves from mobile station UE, for conversion into electric signals, and a transmission circuit that converts electric signals such as voice signals, etc., into radio waves for transmission.

Controller 130 includes, as elements, a mobile station classifier 132, a resource block allocator 134, a control signal generator 136, and a data signal component generator 138. Controller 130 and each element included in controller 130 (mobile station classifier 132, resource block allocator 134, control signal generator 136, and data signal component generator 138) can be functional blocks that are implemented, by a CPU (Central Processing Unit) (not shown) of base station NB executing a computer program stored in a storage device (not shown) and functioning in accordance with the computer program. The operation of controller 130 will be described later.

(6) Configuration of Mobile Station

Figure 9:
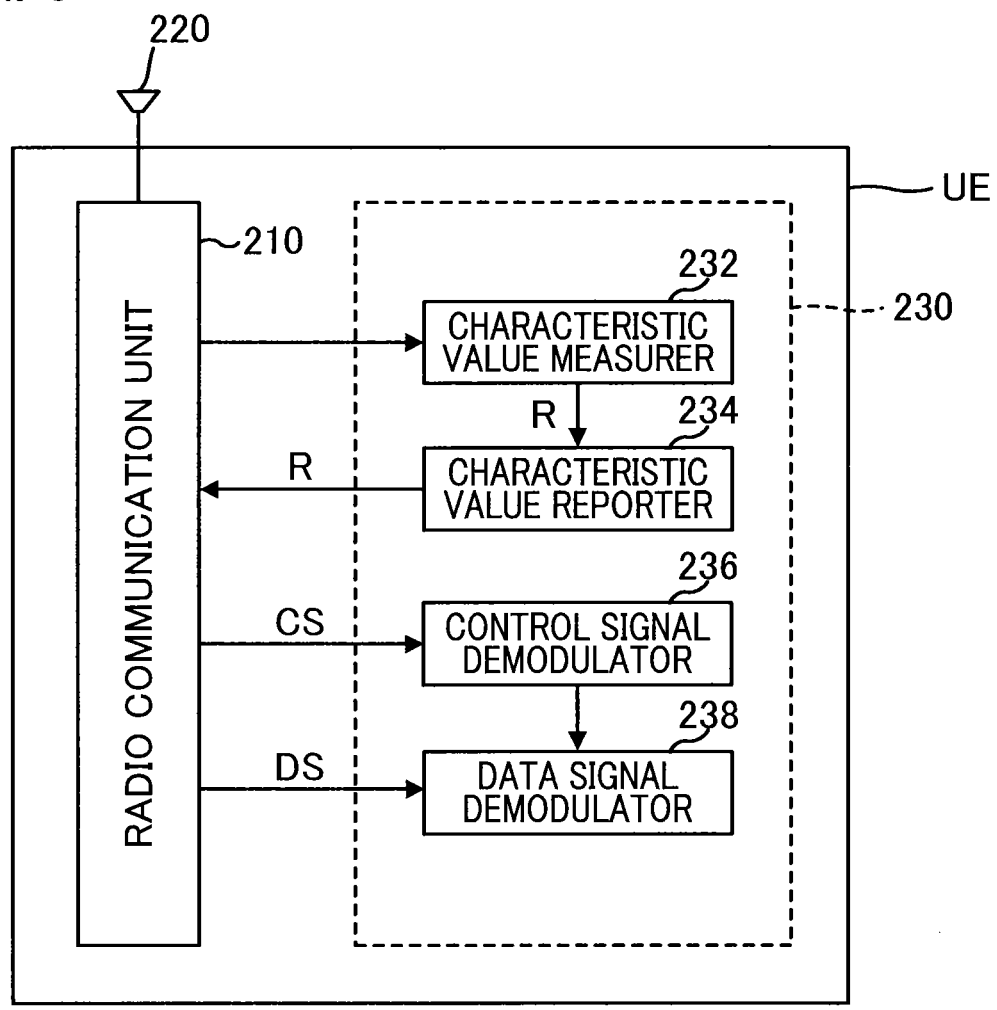
FIG. 9 is a block diagram showing a configuration of the mobile station in the first embodiment of the present invention.

FIG. 9 is a block diagram showing a configuration of mobile station UE according to an embodiment of the present invention. Mobile station UE has a radio communication unit 210 and a controller 230. An output device for outputting voice, video, etc., an input device for receiving instructions from a user, and like elements are not shown in the diagram for the sake of convenience.

Radio communication unit 210 is an element for executing radio communication with base station NB, and includes a transmitter-receiver antenna 220, a reception circuit that receives radio waves from mobile station UE for conversion into electric signals, and a transmission circuit that converts electric signals such as voice signals, etc., into radio waves for transmission.

Controller 230 includes, as elements, a characteristic value measurer 232, a characteristic value reporter 234, a control signal demodulator 236, and a data signal demodulator 238. Controller 230 and each element included in controller 230 (characteristic value measurer 232, characteristic value reporter 234, control signal demodulator 236, and data signal demodulator 238) can be functional blocks that are implemented by a CPU (Central Processing Unit) (not shown) of base station NB executing a computer program stored in a storage device (not shown) and functioning in accordance with the computer program. The operation of controller 230 will be described later.

(7) Flow of Operation

Description will next be given, with reference to FIG. 10, of a flow of an operation of allocating resource blocks RB, and demodulating, decoding, and cancelling data signal components DSC according to the present embodiment.

Through the operation from Steps S110 to S130, each of plural mobile stations UE wirelessly connecting to base station NB is classified into one of plural classes CL, such as is exemplified in FIG. 5, depending on the reception quality at each mobile station UE of a radio signal S (radio waves) from base station NB. Specifically, characteristic value measurer 232 of each mobile station UE measures reference signal reception quality (Reference Signal Received Quality, RSRQ) R of radio waves received from base station NB (Step S110). The measured reference signal reception quality R is supplied to characteristic value reporter 234, and is reported to base station NB via radio communication unit 210 (Step S120). Mobile station classifier 132 of base station NB classifies each mobile station UE into one of plural classes CL depending on reference signal reception quality R reported from each mobile station UE, to supply resource block allocator 134 with class information CLI indicating class CL to which each of plural mobile station UE belongs (Step S130).

A parameter used for the reception quality from base station NB is not limited to reference signal reception quality R but can be a freely selected parameter capable of reflecting reception quality (e.g., reception power (Reference Signal Received Power, RSRP), signal to interference ratio (Signal to Interference Ratio, SIR), or etc.).

The closer mobile station UE is to base station NB, the better the reception quality of radio waves tends to be, and the more distant mobile station UE is from base station NB, the worse the reception quality of radio waves tend to be. Taking this into consideration, in Step S130, mobile station classifier 132 of base station NB may calculate distance from base station NB to each mobile station UE based on reception power, etc., reported from each mobile station UE, to classify, depending on the calculated distance, each mobile station UE into one of plural classes CL.

In Step S140, data signal component generator 138 of base station NB generates plural data signal components DSC that are elements of a data signal DS to be transmitted to plural mobile station UE, for supply to radio communication unit 110. Each data signal component DSC is generated based on data D supplied from an upper layer (not shown) to data signal component generator 138. Also, data signal component generator 138 supplies traffic information TI used for allocation of resource blocks RB with resource block allocator 134. Traffic information TI includes, for example, data amount, etc., to be transmitted to mobile station UE.

In Step S150, resource block allocator 134 of base station NB, based on traffic information TI, class information CLI, and other supplemental information (e.g., forward link channel situations, etc.), allocates resource blocks RB for the transmission of data signal DS (plural data signal component DSC) to plural mobile stations UE wirelessly connecting to base station NB. Specifically, as was described with reference to FIG. 5, the allocation of resource blocks RB is executed so that resource block RB allocated to mobile station UE in class CL for which the reception quality from base station NB is inferior is commonly used as resource block RB allocated to one or more mobile stations UE in another class CL for which the reception quality from base station NB is superior, and so that all of one or more resource blocks RB allocated to mobile station UE in class CL for which the reception quality from base station NB is superior is commonly used with resource block RB allocated to mobile station UE in another class CL for which the reception quality from base station NB is inferior (however, resource block RB is not commonly used among plural mobile stations UE belonging to the same class CL). Information AI indicating the allocation of resource blocks RB to plural mobile station UE is supplied to radio communication unit 110 and to control signal generator 136.

In Step S160, control signal generator 136 of base station NB generates control signal CS containing information AI indicating the allocation of resource blocks RB by resource block allocator 134 to plural mobile stations UE. As was described with reference to FIG. 4, control signal CS includes plural pieces of forward link control information DCI.

FIG. 11 shows a specific configuration of forward link control information DCI. A piece of forward link control information DCI corresponds one to one with mobile station UE. Control signal generator 136 generates, based on information AI indicating the allocation of resource blocks RB to plural mobile station UE, for each mobile station UE, (a) mobile station resource block allocation information UAI indicating the allocation of resource block RB used for transmission of data signal component DSC to the concerned mobile station UE, (b) mobile station identification information UE-ID of low-quality mobile station LUE that is included in adjacent low-quality class ALCL adjacent to class CL to which the concerned mobile station UE belongs and to which the same resource block RB as resource block RB allocated to the concerned mobile station UE is allocated (e.g., mobile station UE-E if the concerned mobile station UE is mobile station UE-H of FIG. 5), and (c) mobile station identification information UE-ID identifying the concerned mobile station UE, between which mobile station identification information UE-ID and the error detection code the EXCLUSIVE-OR operation has been executed. Mobile station identification information UE-ID is an identifier uniquely identifying mobile station UE wirelessly connected to base station NB, and is, for example, a 16-bit, binary number. A CRC (Cyclic Redundancy Check) is preferably used as the error detection code.

It is preferable if control signal generator 136 sets the redundancy higher of forward link control information DCI corresponding to the concerned mobile station UE for which the reception quality from base station NB is inferior. Specifically, for example, as shown in the section (A) of FIG. 12, preferably, the code rate for forward link control information DCI is set higher (the number of bits is set to be fewer) for mobile station UE-H and mobile station UE-I in fourth class CL4 in which the reception quality from base station NB is the most superior; the code rate for forward link control information DCI is set lower (the number of bits is set greater) for mobile station UE-E in third class CL3 for which reception quality is inferior; and the code rate for forward link control information DCI is set further lower (the number of bits is set to be even greater) for mobile station UE-B in second class CL2 for which the reception quality is inferior. More preferably, the size of forward link control information DCI is set so as to be equal to the integral multiple of a 72-bit control channel element (Control Channel Element) CCE, which is a building block of control signal CS. In the foregoing description, four pieces of forward link control information DCI corresponding to four mobile stations UE are shown for explanation, but it should be understood as a matter of course that the number of pieces of forward link control information DCI generated vary depending on the number of mobile stations UE wirelessly connected to base station NB.

Mobile station identification information UE-ID of low-quality mobile station LUE contained in forward link control information DCI corresponding to mobile station UE (e.g., mobile station UE-A) in a class (e.g., first class CL1 in FIGS. 5 and 6) for which the reception quality from base station NB is the most inferior indicates that there is no low-quality mobile station LUE for the concerned mobile station UE.

Figure 12:
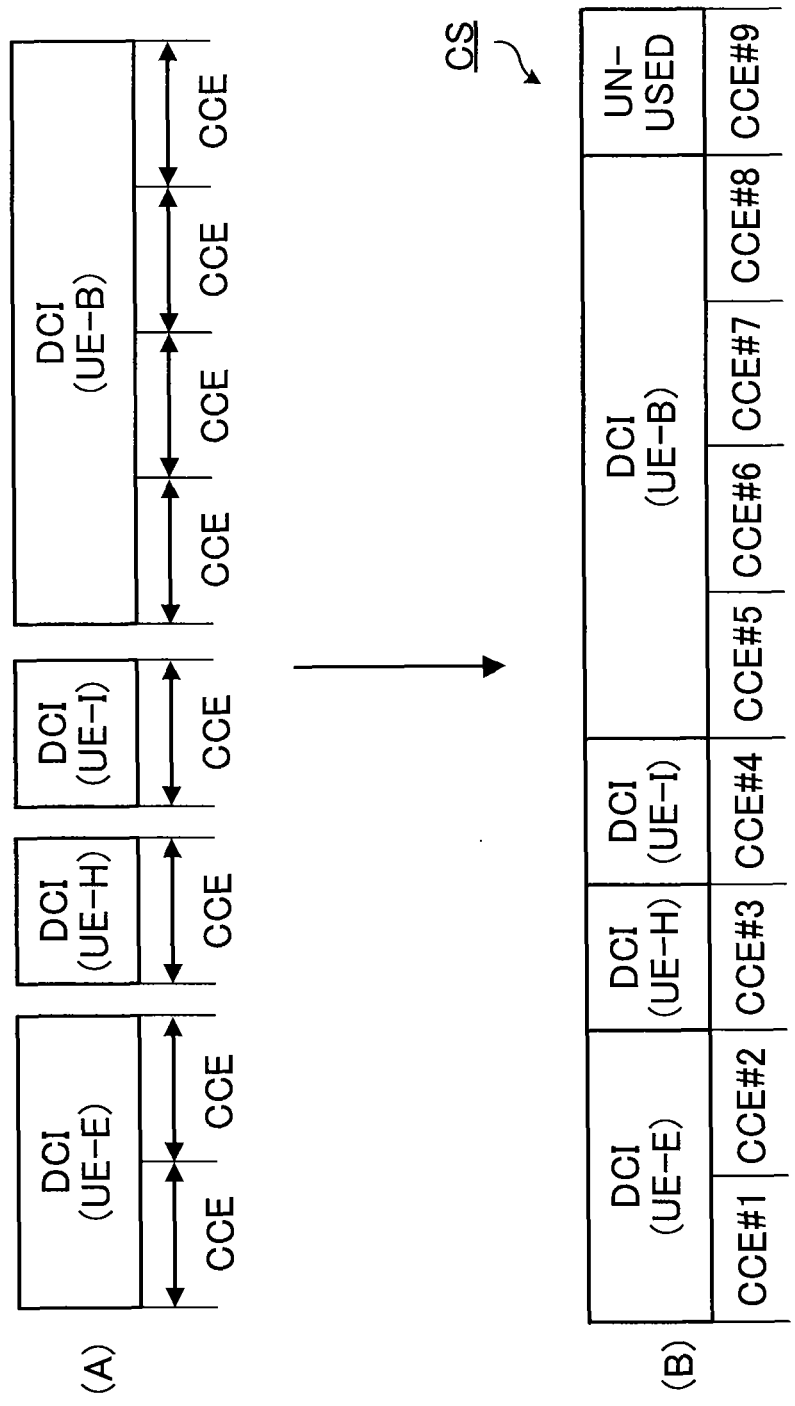
FIG. 12 is a diagram showing how a control signal of the first embodiment of the present invention is generated.

Control signal generator 136 generates control signal CS by concatenating pieces of forward link control information DCI for mobile stations UE (the section (B) of FIG. 12). The number of control channel elements CCE contained in control signal CS is determined in accordance with the transmission bandwidth. As in the section (B) of FIG. 12, in a case in which the number of control channel elements CCE (8 elements) to be transmitted is less than the number of control channel elements CCE (9 elements) contained in control signal CS, the surplus control channel element CCE (CCE #9) may be unused.

In the generation of control signal CS in Step S160, a process other than the processes described above can be included. For example, for consecutive noise tolerance enhancement, control signal CS generated in the above-described manner may be additionally interleaved. Interleaving is preferably executed, for example, in the unit of a predetermined sub-carrier.

In Step S170, radio communication unit 110 of base station NB transmits plural data signal components DSC which data signal component generator 138 has generated and control signal CS which control signal generator 136 has generated. Specifically, radio communication unit 110, as described with reference to FIG. 5, transmits data signal components DSC in accordance with the allocation of resource blocks RB indicated by information AI. Also, radio communication unit 110, as described with reference to FIG. 5, transmits data signal component DSC for mobile station UE for which the reception quality from base station NB is inferior with a greater transmission power. The transmitted plural data signal components DSC are spatially combined to be data signal DS including plural data signal components DSC.

In Step S180, radio communication unit 210 of mobile station UE receives data signal DS transmitted from radio communication unit 110 of base station NB, with the data signal DS being generated by combining plural data signal components DSC, and receives control signal CS transmitted from radio communication unit 110 of base station NB. The received control signal CS is supplied to control signal demodulator 236 of controller 230, and the received data signal DS is supplied to data signal demodulator 238 of controller 230.

Figure 13:
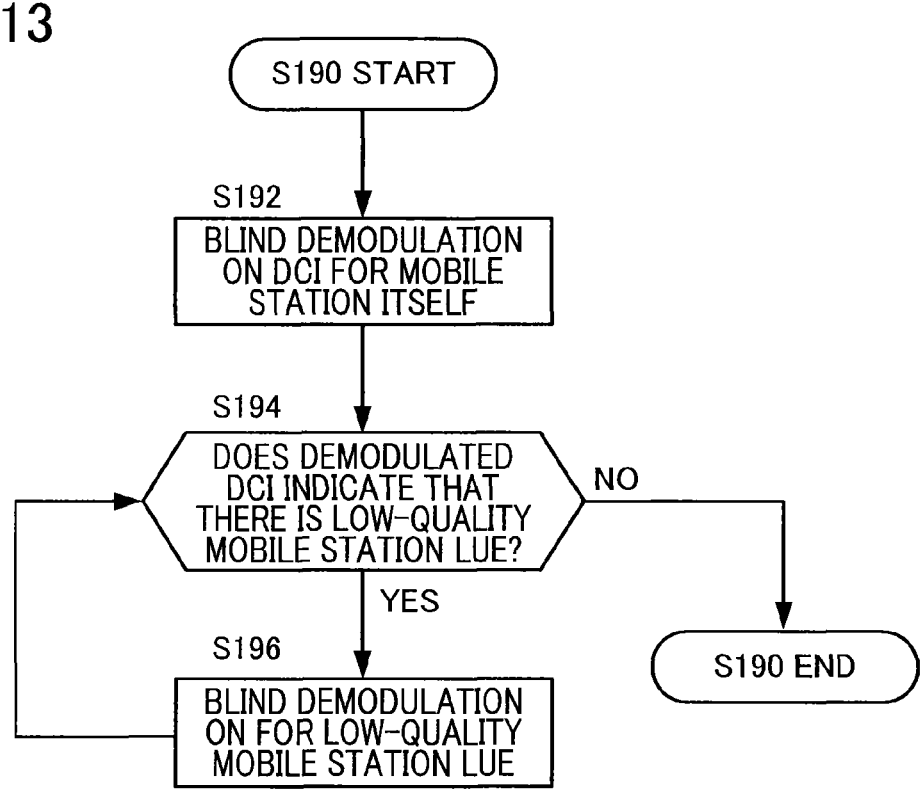
FIG. 13 is an operation flow diagram of demodulating and decoding forward link control information in the first embodiment of the present invention.

In Step S190, control signal demodulator 236 of mobile station UE uses mobile station identification information UE-ID of mobile station UE itself stored in the storage unit (not shown) of mobile station UE, to demodulate and decode, out of the supplied control signal CS, forward link control information DCI corresponding to the mobile station UE. Forward link control information DCI for low-quality mobile station LUE of the mobile station UE is also demodulated and decoded. Specific description will be given below with reference to FIG. 13.

As described above, each forward link control information DCI contains mobile station identification information UE-ID identifying mobile station UE corresponding to the forward link control information DCI, between which mobile station identification information UE-ID and the error detection code the EXCLUSIVE-OR operation has been executed. Therefore, in a case in which mobile station identification information UE-ID identifying mobile station UE corresponding to forward link control information DCI agrees with mobile station identification information UE-ID of mobile station UE itself, the original error detection code is correctly derived (this is because, for a bit string X, the original bit string X is obtained if the EXCLUSIVE-OR operation is executed twice using the same value).

Utilizing the above property, control signal demodulator 236 executes, for forward link control information DCI contained in control signal CS, the EXCLUSIVE-OR operation with mobile station identification information UE-ID of mobile station UE itself, to determine whether the error detection code in forward link control information DCI obtained by the EXCLUSIVE-OR operation agrees with the error detection code of forward link control information DCI obtained by actual calculation. Control signal demodulator 236 executes the determination for each forward link control information DCI until it determines that the error detection code obtained by the EXCLUSIVE-OR operation agrees with the error detection code obtained by actual calculation, and employs forward link control information DCI for which the error detection code obtained by the EXCLUSIVE-OR operation agrees with the error detection code of forward link control information DCI obtained by actual calculation, as forward link control information DCI for itself (Step S192). A series of processes described above is referred to as blind demodulation of forward link control information DCI.

Control signal demodulator 236 refers to mobile station identification information UE-ID of low-quality mobile station LUE contained in the demodulated forward link control information DCI for the mobile station itself, and in a case in which it is determined that there is no low-quality mobile station LUE (Step S194: NO), Step S190 is completed to proceed to Step S200. On the other hand, in a case in which it is determined that there is low-quality mobile station LUE (Step S194: YES), control signal demodulator 236 demodulates mobile station identification information UE-ID of low-quality mobile station LUE to execute blind demodulation as in Step S192 (Step S196). In a case in which forward link control information DCI for low-quality mobile station LUE obtained by the blind demodulation in Step S196 indicates that there is an additional low-quality mobile station LUE, blind demodulation is additionally executed (Step S194: YES→Step S196). Thus, the process of Step S190 (i.e., demodulation and decoding of forward link control information DCI) is executed until forward link control information DCI is demodulated which contains mobile station identification information UE-ID of low-quality mobile station LUE indicating that there is no low-quality mobile station LUE.

In a case in which there is low-quality mobile station LUE corresponding to mobile station UE, through the process of Step S190, mobile station order information OI indicating an order in which reception power of each low-quality mobile station LUE from base station NB is inferior (i.e., an order in which data signal component DSC is cancelled) is obtained by control signal demodulator 236. The obtained mobile station order information OI is supplied to data signal demodulator 238.

In Step S200, data signal demodulator 238 of mobile station UE, in a case in which data signal DS supplied from radio communication unit 210 contains data signal component DSC corresponding to low-quality mobile station LUE, that is mobile station UE in low-quality class LCL, demodulates data signal component DSC destined for mobile station UE itself by using forward link control information DCI corresponding to mobile station UE itself after demodulating and cancelling data signal component DSC by using forward link control information DCI corresponding to low-quality mobile station LUE.

Specifically, as described above with reference to FIG. 7, based on mobile station order information OI obtained in the process of Step S190, data signal demodulator 238 demodulates and decodes data signal component DSC for mobile station UE after demodulating, decoding, and canceling data signal components DSC by using forward link control information DCI of each low-quality mobile station LUE, in order from data signal component DSC corresponding to mobile station UE in a lower-quality class CL (i.e., from data signal component DSC for which the transmission power is greater).

(8) Conclusion

As has been described in the foregoing, in a configuration in which all of one or more resource blocks RB allocated to one mobile station UE in class CL for which the reception power from base station NB is superior is commonly used as resource block RB allocated to mobile station UE in class CL for which the reception power from base station NB is inferior (i.e., low-quality class LCL), mobile station identification information UE-ID of low-quality mobile station LUE to which the same resource block RB as resource block RB allocated to the one mobile station UE is allocated is notified by forward link control information DCI, the low-quality mobile station LUE being included in adjacent low-quality class ALCL to the one mobile station UE, for which demodulation and decoding of data signal component DSC is to be executed. Forward link control information DCI of low-quality mobile station LUE also includes mobile station identification information UE-ID of low-quality mobile station LUE. Therefore, even though information regarding the allocation of resource blocks RB to another mobile station UE is not directly notified, it is possible to know which data signal component DSC (mobile station UE) is to be cancelled and the order in which it is canceled if mobile station UE about to execute demodulation and decoding of data signal component DSC for itself traces low-quality mobile station LUE contained in forward link control information DCI in the order. According to the above configuration, regardless of the number of low-quality mobile stations LUE, because each piece of forward link control information DCI contains only one piece of mobile station identification information UE-ID of low-quality mobile station LUE, it is possible to make the size of forward link control information DCI be a fixed length. Therefore, the configuration of control signal CS becomes simpler, and the overhead of the control signal process at mobile station UE can be additionally reduced.

Second Embodiment

Description will be given of a second embodiment of the present invention. In each mode illustrated below, for an element for which action and function are the same as those of the first embodiment, the reference numerals used in the foregoing description will also be used, and description thereof will be omitted as appropriate.

In the first embodiment, full-length mobile station identification information UE-ID of low-quality mobile station LUE is mounted on forward link control information DCI. In the second embodiment, a part of mobile station identification information UE-ID of low-quality mobile station LUE is mounted on forward link control information DCI.

As described above, mobile station identification information UE-ID is an identifier uniquely identifying mobile station UE wirelessly connected to base station NB. In the second embodiment, mobile station identification information UE-ID is a 16-bit, binary number.

Figure 14:
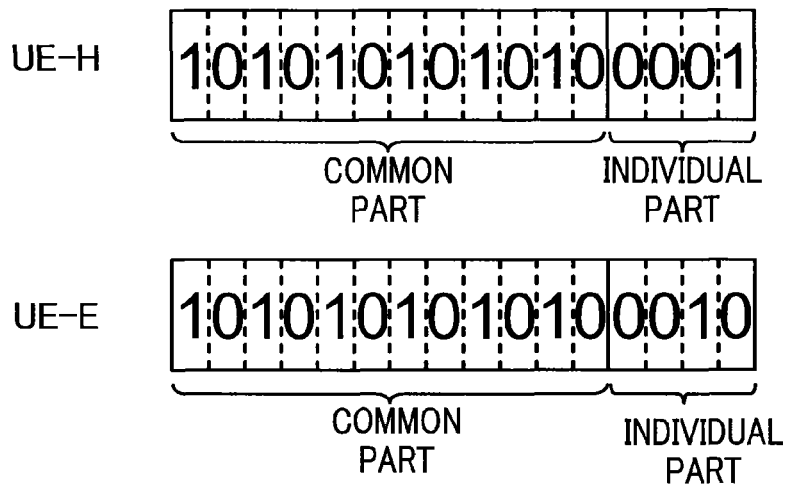
FIG. 14 is a diagram showing examples of mobile station identification information of a low-quality mobile station according to a second embodiment of the present invention.

FIG. 14 is a diagram illustrating mobile station identification information UE-ID of low-quality mobile station LUE in the second embodiment. Pieces of mobile station identification information UE-ID for mobile station UE-H and mobile station UE-E are illustrated. Each piece of mobile station identification information UE-ID is sectioned into the higher 12-bit common part (101010101010) and the lower 4-bit individual part (0001 or 0010).

The common part is an identifier indicating a set G of mobile stations UE to which all or a part of resource blocks RB allocated to one mobile station UE in class CL for which the reception quality from base station NB is the most inferior are allocated. In referring also to FIG. 5, for mobile station UE-A in first class CL1 for which the reception quality from base station NB is the most inferior, all of plural resource blocks RB are allocated. A part of the plural resource blocks RB allocated to mobile station UE-A are allocated to mobile station UE-B to mobile station UE-K. Therefore, mobile station UE-A to mobile station UE-K belong to set G. For this reason, each mobile station identification information UE-ID of mobile station UE-A to mobile station UE-K includes the common part (101010101010) indicating the same set G.

The individual part is an identifier indicating one of mobile stations UE (mobile station UE-A to mobile station UE-K) included in set G. The individual part 0001 indicates mobile station UE-H, and the individual part 0010 indicates mobile station UE-E.

Mobile station UE included in set G is notified from base station NB in advance of the common part of mobile station identification information UE-ID indicating set G. Mobile station UE is notified of the common part, for example, when mobile station UE comes to belong to set G after mobile station UE hands over to base station NB. The notified common part is stored in the storage device (not shown) of mobile station UE.

Figure 10:
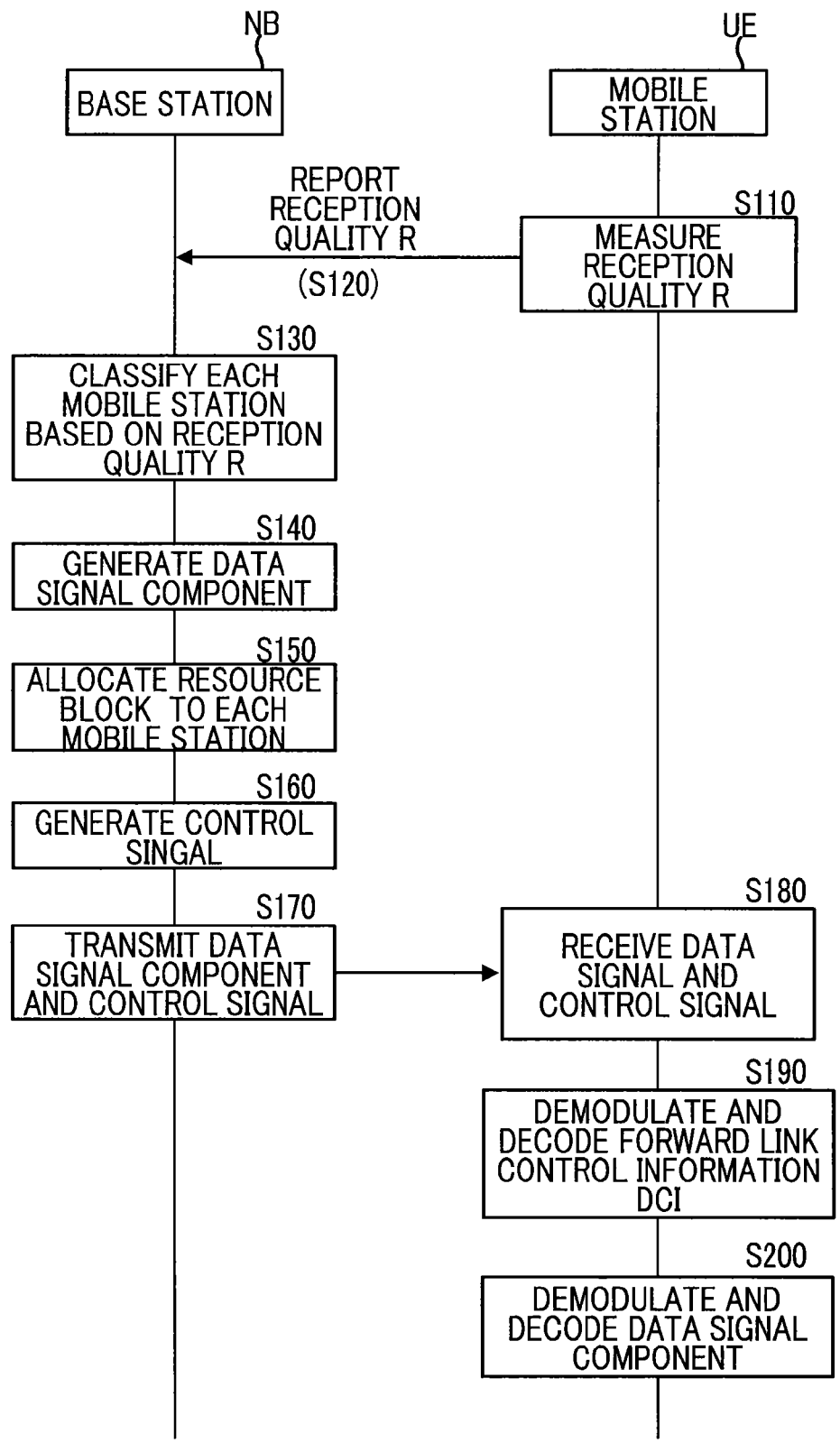
FIG. 10 is an operation flow diagram for allocating a resource block RB, and demodulating, decoding, and cancelling a data signal component DSC in the first embodiment of the present invention.

Control signal generator 136 of base station NB generates control signal CS by including in forward link control information DCI, as mobile station identification information UE-ID of low-quality mobile station LUE, only the individual part (not the entire mobile station identification information UE-ID) (Step S160 in FIG. 10).

Control signal demodulator 236 of mobile station UE uses the common part stored in the storage device (not shown) of mobile station UE and the individual part contained in the demodulated forward link control information DCI, to restore 16-bit mobile station identification information UE-ID, and uses the restored mobile station identification information UE-ID, to demodulate forward link control information DCI corresponding to mobile station identification information UE-ID (Step S190 in FIG. 10).

Description is given of mobile station UE-H and mobile station UE-E, which is low-quality mobile station LUE of mobile station UE-H as examples. Forward link control information DCI for mobile station UE-H contains the individual part 0010 indicating mobile station UE-E, which is low-quality mobile station LUE of mobile station UE-H. Therefore, when mobile station UE-H uses mobile station identification information UE-ID stored therein, to demodulate forward link control information DCI, the individual part 0010 is obtained. Mobile station UE-H, based on the common part 101010101010 notified in advance and stored in the storage device and the individual part 0010 obtained by demodulation, restores mobile station identification information UE-ID (1010101010100010) of mobile station UE-E, for use to demodulate forward link control information DCI for mobile station UE-E.

According to the above configuration, in comparison with a configuration in which full-length mobile station identification information UE-ID of low-quality mobile station LUE is included in forward link control information DCI, the number of bits mounted on forward link control information DCI is reduced, and therefore, the processing burden of control signal CS at mobile station UE can be reduced.

Modifications

The above embodiments are modified in various ways. Specific modes of modifications are illustrated below. Two or more embodiments freely selected from the above embodiments and modes illustrated in the following can be combined as appropriate as long as they do not conflict with each other.

(1) Modification 1

In each of the above embodiments, as shown in FIG. 5, resource block RB allocated to one mobile station UE in class CL for which the reception quality from base station NB is inferior is commonly used as resource block RB allocated to one or more mobile stations UE in class CL for which the reception quality from base station NB is superior, and all of one or more resource blocks RB allocated to one mobile station UE in class CL for which the reception quality from base station NB is superior is commonly used as resource block RB allocated to one mobile station UE in class CL for which the reception quality from base station NB is inferior. However, resource blocks RB may be allocated only so that resource block RB used for transmission of data signal component DSC to one mobile station UE in one class CL is not commonly used as resource block RB used for transmission of data signal component DSC to another mobile station UE belonging to the same class CL but is commonly used as resource block RB used for transmission of data signal component DSC to mobile station UE belonging to another class CL than the class CL. Therefore, as shown in FIG. 15, resource block RB allocated to mobile station UE may be allocated to two or more low-quality mobile stations LUE (e.g., resource blocks RB allocated to mobile station UE-F are allocated to two mobile stations UE (mobile station UE-B and mobile station UE-C)).

In the above configuration, control signal generator 136 of base station NB mounts, on control signal CS, information AI indicating the allocation of resource blocks RB to plural mobile stations UE. Mobile station UE, based on the above information AI contained in control signal CS, demodulates and decodes data signal component DSC for mobile station UE itself after demodulating, decoding, and canceling another data signal component DSC than data signal component DSC for mobile station UE itself, the another data signal components DSC being superposed in resource block RB allocated to mobile station UE itself.

Also, according to the above configuration, the effect can be achieved of increased frequency efficiency by superposing plural data signal components DSC in common resource block RB. Also, there is an advantage that resource blocks RB can be freely allocated to each mobile station UE. However, in employing the above configuration, it is necessary to transmit control signal CS (information AI indicating the allocation of resource blocks RB to plural mobile station UE) to each mobile station UE with transmission power for mobile station UE for which the reception quality from base station NB is the most inferior. Therefore, it is preferable to employ the previously described embodiment if the overhead reduction in the control signal process at mobile station UE is taken into consideration.

(2) Modification 2

In each of the above embodiments, the EXCLUSIVE-OR operation has been executed between mobile station identification information UE-ID of mobile station UE corresponding to forward link control information DCI contained in forward link control information DCI and the error detection code. However, such an EXCLUSIVE-OR operation is optional. It is sufficient if mobile station identification information UE-ID of mobile station UE corresponding to forward link control information DCI can be demodulated at receiver mobile station UE, and if mobile station UE can be identified by the demodulated mobile station identification information UE-ID.

(3) Modification 3

Mobile station UE is a freely selected apparatus capable of wirelessly communicating with base station NB. Mobile station UE may be a portable telephone terminal such as a feature phone or a smart phone, etc., may be a desktop personal computer, a laptop personal computer, an UMPC (Ultra-Mobile Personal Computer), a portable game device, or other types of radio terminal.

(4) Modification 4

Each function that a CPU executes in each element of radio communication system 1 (base station NB and mobile station UE) may be executed by a piece of hardware instead of by a CPU, or by a programmable logic device such as an FPGA (Field Programmable Gate Array), DSP (Digital Signal Processor), etc.

Description of Reference Numerals

1 . . . radio communication system, NB . . . base station, 110 . . . radio communication unit, 120 . . . transmitter-receiver antenna, 130 . . . controller, 132 . . . mobile station classifier, 134 . . . resource block allocator, 136 . . . control signal generator, 138 . . . data signal component generator, UE . . . mobile station, 210 . . . radio communication unit, 220 . . . transmitter-receiver antenna, 230 . . . controller, 232 . . . characteristic value measurer, 234 . . . characteristic value reporter, 236 . . . control signal demodulator, 238 . . . data signal demodulator, ALCL . . . adjacent low-quality class, CCE . . . control channel element, CL . . . class, CLI . . . class information, CR . . . control region, CS . . . control signal, DCI . . . forward link control information, DR ... data region, DS ... data signal, DSC ... data signal component, LCL ... low-quality class, OI ... mobile station order information, LUE ... low-quality mobile station, RB ... resource block, S ... radio signal, UAI ... mobile station resource block allocation information, UE-ID ... mobile station identification information.

The invention claimed is:

1. A radio communication system comprising:
   plural mobile stations; and
   a base station for wirelessly communicating with each of the plural mobile stations by using a resource block corresponding to a predetermined time period and to a frequency bandwidth, wherein
   the base station comprises:
     first circuitry configured to function as
       a mobile station classifier that classifies each of the mobile stations into one of plural classes based on the reception quality from the base station;
       a resource block allocator that allocates resource blocks to the plural mobile stations so that a resource block used for transmission of a data signal component to a mobile station in a class is not commonly used as a resource block used for transmission of a data signal component to another mobile station belonging to the same class but is commonly used as a resource block used for transmission of a data signal component to another mobile station belonging to another class;
       a data signal component generator that generates plural data signal components to be transmitted to the plural mobile stations;
       a control signal generator that generates a control signal containing information indicating the allocation of the resource blocks by the resource block allocator to the plural mobile stations; and
       a transmitter that is an element that transmits the plural data signal components generated by the data signal component generator and the control signal generated by the control signal generator, the transmitter being configured to transmit the data signal components in accordance with the allocation of the resource blocks by the resource block allocator, a data signal component, from among the data signal components, being transmitted to a mobile station with an inferior reception quality from the base station with a greater transmission power, wherein
   each of the plural mobile stations comprises:
     second circuitry configured to function as
       a receiver that receives a data signal for which the plural data signal components have been combined, the data signal being transmitted from the transmitter of the base station, and the control signal transmitted from the transmitter of the base station; and
       a data signal demodulator that, when the data signal received by the receiver of the mobile station includes a data signal component corresponding to a low-quality mobile station, the low-quality mobile station being a mobile station in a low-quality class that is a class for which the reception quality from the base station is inferior to a class to which the mobile station belongs, demodulates a data signal component corresponding to the mobile station after demodulating and cancelling the data signal component corresponding to the low-quality mobile station, wherein
   the resource block allocator of the base station executes the allocation of the resource blocks to the plural mobile stations so that a resource block allocated to a mobile station in a class for which the reception quality from the base station is inferior is used commonly as a resource block allocated to one or more mobile stations in a class for which the reception quality from the base station is superior and so that all of one or more resource blocks allocated to a mobile station in a class for which the reception quality from the base station is superior is commonly used as a resource block allocated to a mobile station in a class for which the reception quality from the base station is inferior,
   the control signal generator of the base station generates the control signal by multiplexing plural control elements, the control elements corresponding one-to-one to the plural mobile stations, with each control element containing (a) mobile station resource block allocation information indicating the allocation of a resource block used for transmission of a data signal component to a mobile station, (b) low-quality mobile station identification information indicating a low-quality mobile station to which the same resource block as the resource block allocated to the mobile station is allocated, the low-quality mobile station being a low-quality mobile station in a low-quality class adjacent to the class to which the mobile station belongs, and (c) mobile-station-self-identification information identifying the mobile station,
   the low-quality mobile station identification information contained in a control element corresponding to a mobile station in a class for which the reception quality from the base station is the most inferior indicates that there is no low-quality mobile station for the mobile station,
   the second circuitry is further configured to function as
     a control signal first demodulator that demodulates a control element corresponding to the mobile station out of the control signal received by the receiver of the mobile station by using mobile-station-self-identification information of the mobile station; and
     a control signal second demodulator that executes demodulating, by using low-quality mobile station identification information contained in the demodulated control element, a control element, out of the control signal, corresponding to a low-quality mobile station indicated by the low-quality mobile station identification information until a control element containing low-quality mobile station identification information indicating that there is no low-quality mobile station is demodulated, and
   the data signal demodulator of the mobile station uses the control element corresponding to the mobile station, to demodulate the data signal component corresponding to the mobile station, after demodulating and cancelling a data signal component corresponding to the low-quality mobile station by using the control element corresponding to the low-quality mobile station.

2. The radio communication system according to claim 1, wherein
   the control signal generator of the base station generates the control signal so that the control element corresponding to a mobile station for which the reception quality from the base station is inferior has a higher redundancy.

3. The radio communication system according to claim 1, wherein
- in the radio communication system, the mobile station is identifiable by using mobile station distinction information including a common part indicating a set of mobile stations to which all or a part of resource blocks to be allocated to a mobile station in a class for which the reception quality from the base station is the most inferior and an individual part indicating each mobile station included in the set of the mobile stations,
- each of the plural mobile stations is notified in advance of the common part from the base station,
- the control signal generator of the base station generates the control signal by multiplexing the plural control elements, each of the control elements containing the individual part as the low-quality mobile station identification information, and
- the control signal second demodulator of the mobile station uses the common part stored in the mobile station and the individual part contained in the demodulated control element, to demodulate the control element corresponding to the low-quality mobile station indicated by the common part and the individual part.

4. A base station in a radio communication system comprising:
- plural mobile stations; and
- a base station for wirelessly communicating with each of the plural mobile stations by using a resource block corresponding to a predetermined time period and to a frequency bandwidth,
- the base station comprising:
- circuitry configured to function as
    - a mobile station classifier that classifies each of the mobile stations into one of plural classes based on the reception quality from the base station;
    - a resource block allocator that allocates resource blocks to the plural mobile stations so that a resource block used for transmission of a data signal component to a mobile station in a class is not commonly used as a resource block used for transmission of a data signal component to another mobile station belonging to the same class but is commonly used as a resource block used for transmission of a data signal component to another mobile station belonging to another class;
    - a data signal component generator that generates plural data signal components to be transmitted to the plural mobile stations;
    - a control signal generator that generates a control signal containing information indicating the allocation of the resource blocks by the resource block allocator to the plural mobile stations; and
    - a transmitter that is an element that transmits the plural data signal components generated by the data signal component generator and the control signal generated by the control signal generator, the transmitter being configured to transmit the data signal components in accordance with the allocation of the resource blocks by the resource block allocator, a data signal component, from among the data signal components, being transmitted to a mobile station with an inferior reception quality from the base station with a greater transmission power, wherein
- the resource block allocator of the base station executes the allocation of the resource blocks to the plural mobile stations so that a resource block allocated to a mobile station in a class for which the reception quality from the base station is inferior is used commonly as a resource block allocated to one or more mobile stations in a class for which the reception quality from the base station is superior and so that all of one or more resource blocks allocated to a mobile station in a class for which the reception quality from the base station is superior is commonly used as a resource block allocated to a mobile station in a class for which the reception quality from the base station is inferior,
- the control signal generator generates the control signal by multiplexing plural control elements, the control elements corresponding one-to-one to the plural mobile stations, with each control element containing (a) mobile station resource block allocation information indicating the allocation of a resource block used for transmission of a data signal component to a mobile station, (b) low-quality mobile station identification information indicating a low-quality mobile station to which the same resource block as the resource block allocated to the mobile station is allocated, the low-quality mobile station being a low-quality mobile station in a low-quality class adjacent to the class to which the mobile station belongs, out of low-quality mobile stations being mobile stations in a low-quality class for which the reception quality from the base station is inferior in comparison to the class to which the mobile station belongs, and (c) mobile-station-self-identification information identifying the mobile station, and
- the low-quality mobile station identification information contained in a control element corresponding to a mobile station in a class for which the reception quality from the base station is the most inferior indicates that there is no low-quality mobile station for the mobile station.

5. A mobile station in a radio communication system including plural mobile stations, and a base station for wirelessly communicating with each of the plural mobile stations by using a resource block corresponding to a predetermined time period and to a frequency bandwidth and for classifying each of the mobile stations into one of plural classes based on the reception quality from the base station itself, the mobile station comprising:
- a receiver that receives a data signal and a control signal transmitted from the base station, the data signal including a data signal component for the mobile station and a data signal component for another mobile station being superposed, and the control signal including information indicating the allocation, by the base station, of resource blocks to the plural mobile stations, wherein
- the control signal includes plural elements being multiplexed, the control elements corresponding one-to-one to the plural mobile stations, with each control element containing (a) mobile station resource block allocating information indicating the allocation of a resource block used for transmission of a data signal component to 3 mobile station, (b) low-quality mobile station identification information indicating a low-quality mobile station to which the same resource block as the resource block allocated to the mobile station is allocated, the low-quality mobile station being a low-quality mobile station in a low-quality class adjacent to the class to which the mobile station belongs, out of low-quality mobile stations being mobile stations in a low-quality class for which the reception quality from the base station is inferior in comparison to the class to which the mobile station belongs, and (c) mobile-station-self-identification information identifying the mobile station, the low-quality mobile station identification information contained in a control element corresponding to a mobile station in a class for which the reception quality from the base station is the most inferior indicates that there is no low-quality mobile station for the mobile station, the mobile station further comprising circuitry configured to demodulate a control element corresponding to the mobile station out of the control signal received by the receiver of the mobile station by using mobile-station-self-identification information of the mobile station; and execute demodulating, by using low-quality mobile station identification information contained in the demodulated control element, a control element, out of the control signal, corresponding to a low-quality mobile station indicated by the low-quality mobile station identification information until a control element containing low-quality mobile station identification information indicating that there is no low-quality mobile station is demodulated, and when the data signal received by the receiver of the mobile station includes a data signal component corresponding to a low-quality mobile station, the circuitry is configured to use the control element corresponding to the mobile station, to demodulate the data signal component corresponding to the mobile station, after demodulating and cancelling a data signal component corresponding to the low-quality mobile station by using the control element corresponding to the low-quality mobile station.

6. A communication control method in a radio communication system including plural mobile stations, and a base station for wirelessly communicating with each of the plural mobile stations by using a resource block corresponding to a predetermined time period and to a frequency bandwidth, the method comprising:

classifying, at the base station, each of the mobile stations into one of plural classes based on the reception quality from the base station;

allocating, at the base station, resource blocks to the plural mobile stations so that a resource block used for transmission of a data signal component to a mobile station in a class is not commonly used as a resource block used for transmission of a data signal component to another mobile station belonging to the same class but is commonly used as a resource block used for transmission of a data signal component to another mobile station belonging to another class, so that a resource block allocated to a mobile station in a class for which the reception quality from the base station is inferior is used commonly as a resource block allocated to one or more mobile stations in a class for which the reception quality from the base station is superior, and so that all of one or more resource blocks allocated to a mobile station in a class for which the reception quality from the base station is superior is commonly used as a resource block allocated to a mobile station in a class for which the reception quality from the base station is inferior;

generating, at the base station, plural data signal components to be transmitted to the plural mobile stations;

generating, at the base station, a control signal containing plural control elements which are multiplexed, the control elements corresponding one-to-one to the plural mobile stations, with each control element containing (a) mobile station resource block allocation information indicating the allocation of a resource block used for transmission of a data signal component to a corresponding mobile station, (b) low-quality mobile station identification information indicating a low-quality mobile station to which the same resource block as the resource block allocated to the mobile station is allocated, the low-quality mobile station being a mobile station in a low-quality class adjacent to a class to which the mobile station belongs, out of low-quality mobile stations being mobile stations in a low-quality class for which the reception quality from the base station is inferior in comparison to the class to which the mobile station belongs, and (c) mobile-station-self-identification information identifying the mobile station;

in transmitting the plural data signal components and the control signal, transmitting, from the base station, the data signal components in accordance with the allocation of the resource blocks, a data signal component, from among the data signal components, being transmitted to a mobile station with an inferior reception quality from the base station with a greater transmission power, wherein the low-quality mobile station identification information contained in a control element corresponding to a mobile station in a class for which the reception quality from the base station is the most inferior indicates that there is no low-quality mobile station for the mobile station;

receiving, at the mobile station, a data signal for which the plural data signal components have been combined, the data signal being transmitted from the base station, and the control signal transmitted from the base station;

demodulating, at the mobile station, a control element corresponding to the mobile station out of the control signal received by the mobile station by using mobile-station-self-identification information of the mobile station;

demodulating, at the mobile station, by using low-quality mobile station identification information contained in the demodulated control element, a control element, out of the control signal, corresponding to a low-quality mobile station indicated by the low-quality mobile station identification information indicating that there is no low-quality mobile station is demodulated; and when the data signal received by the mobile station includes a data signal component corresponding to a low-quality mobile station, the low-quality mobile station, using, at the mobile station, the control element corresponding to the mobile station, to demodulate the data signal component corresponding to the mobile station, after demodulating and cancelling a data signal component corresponding to the low-quality mobile station by using the control element corresponding to the low-quality mobile station.

* * * * *